(12) United States Patent
Sugiura et al.

(10) Patent No.: US 6,517,463 B2
(45) Date of Patent: Feb. 11, 2003

(54) AUTOMATIC TRANSMISSION FOR VEHICLE

(75) Inventors: Nobutada Sugiura, Anjo (JP); Takuya Ishii, Anjo (JP); Minoru Todo, Anjo (JP); Kazuhisa Ozaki, Anjo (JP); Youichi Hayakawa, Anjo (JP); Hiroshi Ito, Toyota (JP); Toshiki Kanada, Toyota (JP); Yasuo Hojo, Toyota (JP); Yuji Kashihara, Toyota (JP)

(73) Assignees: Aisin Aw Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 09/757,708

(22) Filed: Jan. 11, 2001

(65) Prior Publication Data

US 2001/0034284 A1 Oct. 25, 2001

(30) Foreign Application Priority Data

| Jan. 11, 2000 | (JP) | .................... 2000-002760 |
| Oct. 19, 2000 | (JP) | .................... 2000-319906 |

(51) Int. Cl.⁷ ............................................. F16H 3/44
(52) U.S. Cl. ........................................ 475/287; 475/292
(58) Field of Search ............................... 475/286, 287, 475/292

(56) References Cited

U.S. PATENT DOCUMENTS

| 3,318,174 A | * | 5/1967 | Clapp et al. ............... 475/283 |
| 3,996,817 A | * | 12/1976 | Winzeler .................... 475/286 |
| 4,070,927 A | | 1/1978 | Polak ........................... 74/765 |
| 4,994,006 A | * | 2/1991 | Kinoshita et al. ............ 475/286 |
| 5,226,862 A | * | 7/1993 | Hattori ....................... 475/286 |
| 5,342,257 A | | 8/1994 | Hotta .......................... 475/275 |
| 5,690,579 A | * | 11/1997 | Takeda et al. ............... 475/280 |
| 6,074,323 A | * | 6/2000 | Collins et al. ............... 475/286 |
| 6,176,803 B1 | * | 1/2001 | Meyer et al. ................. 475/286 |

FOREIGN PATENT DOCUMENTS

| JP | 2-129446 | 5/1990 |
| JP | 4-29650 | 1/1992 |
| JP | 5-026310 | 2/1993 |
| JP | 6-200998 | 7/1994 |
| JP | 6-201000 | 7/1994 |
| JP | 10-259861 | 9/1998 |
| JP | 11-051127 | 2/1999 |
| JP | 11-063122 | 5/1999 |

* cited by examiner

Primary Examiner—Pam Rodriguez
Assistant Examiner—Robert A. Siconolfi
(74) Attorney, Agent, or Firm—Lorusso & Loud

(57) ABSTRACT

A compact automatic transmission for a vehicle capable of preventing increase in relative rotational speed between shift elements. A planetary gear unit is provided with a sun gear to which rotation of an input shaft is input, a carrier that can be stopped from rotating, and a ring gear for outputting, to a planetary gear set, rotation that is reduced in speed relative to that of the input shaft. A clutch is connected/disconnected, the input shaft and the sun gear are appropriately connected/disconnected, and the carrier is appropriately stopped/unstopped by a brake and a one-way clutch. This prevents relative rotational speed between shift elements of the gear unit that does not participate in a shifting operation from excessively increasing. When the clutch is disposed between the input shaft and the sun gear, the torque capacity of the clutch can be reduced as compared with the case where it is disposed between the gear unit and the gear set. Therefore, the clutch can be formed into a more compact structure and the overall automatic transmission can be made more compact.

18 Claims, 14 Drawing Sheets

FIG. 1(a)  OPERATION TABLE AND GEAR RATIO $(\lambda_1=0.4286, \lambda_2=0.4247, \lambda_3=0.4000,)$

| | C-1 | C-2 | C-3 | B-1 | B-2 | B-3 | B-4 | F-1 | F-2 | F-3 | GEAR RATIO | STEP |
|---|---|---|---|---|---|---|---|---|---|---|---|---|
| P | | | | | | | | | | | – | REV/1ST |
| REV | | | ○ | (○) | | | ○ | ○ | | | 3.468 | 0.991 |
| N | | | | | | | | | | | – | |
| 1ST | ○ | | | | | | (○) | | | ○ | 3.500 | 1.745 |
| 2ND | ○ | | | (○) | ○ | | | | ○ | | 2.006 | 1.431 |
| 3RD | ○ | | ○ | (○) | | ⊙ | | | ○ | | 1.402 | 1.402 |
| 4TH | ○ | ○ | ⊙ | | ⊙ | | | | | | 1.000 | 1.384 |
| 5TH | | ○ | ○ | ○ | ⊙ | | | | | | 0.722 | 1.208 |
| (6TH) | | ○ | | ⊙ | ○ | ⊙ | | | | | 0.598 | |

(○) ENGINE BRAKING  ⊙ BRAKE OR CLUTCH IS ENGAGED, BUT NO TORQUE IS TRANSMITTED.   GEAR RATIO WIDTH 4.846

FIG. 2(a) OPERATION TABLE AND GEAR RATIO $(\lambda_1 = 0.4286, \lambda_2 = 0.4247, \lambda_3 = 0.4000,)$

| | C-1 | C-2 | C-3 | B-1 | B-2 | B-3 | B-4 | F-1 | F-2 | F-3 | GEAR RATIO | STEP |
|---|---|---|---|---|---|---|---|---|---|---|---|---|
| P | | | | | | | | | | | – | REV/1ST |
| REV | | | O | (O) | | | O | O | | | 3.468 | 0.991 |
| N | | | | | | | | | | | – | |
| 1ST | O | | | | | | (O) | | | O | 3.500 | 1.745 |
| 2ND | O | | | (O) | O | | | O | O | | 2.006 | 1.431 |
| 3RD | O | | O | (O) | | ⊙ | O | | | | 1.402 | 1.402 |
| 4TH | O | O | ⊙ | | | ⊙ | | | | | 1.000 | 1.384 |
| 5TH | | O | O | | | ⊙ | | | | | 0.722 | 1.208 |
| (6TH) | | O | | ⊙ | O | ⊙ | | | | | 0.598 | |

(O) ENGINE BRAKING  ⊙ BRAKE OR CLUTCH IS ENGAGED, BUT NO TORQUE IS TRANSMITTED.   GEAR RATIO WIDTH 4.846

FIG. 3(a) OPERATION TABLE AND GEAR RATIO ($\lambda_1 = 0.4286, \lambda_2 = 0.4247, \lambda_3 = 0.4000,$)

| | C-1 | C-2 | C-3 | B-1 | B-2 | B-3 | B-4 | F-1 | F-2 | F-3 | GEAR RATIO | STEP |
|---|---|---|---|---|---|---|---|---|---|---|---|---|
| P | | | | | | | | | | | – | |
| REV | | | O | (O) | | | O | O | | | 3.468 | REV/1ST 0.991 |
| N | | | | | | | | | | | – | |
| 1ST | O | | | | | | (O) | | | O | 3.500 | 1.745 |
| 2ND | O | | | (O) | O | | | O | O | | 2.006 | 1.431 |
| 3RD | O | | O | (O) | | O | | O | | | 1.402 | 1.402 |
| 4TH | O | O | ◎ | | | O | | | | | 1.000 | 1.384 |
| 5TH | | O | O | O | | ◎ | | | | | 0.722 | |

(O) ENGINE BRAKING  ◎ BRAKE OR CLUTCH IS ENGAGED, BUT NO TORQUE IS TRANSMITTED.    GEAR RATIO WIDTH 4.846

1ST $(1+\lambda_3)/\lambda_3$

2ND $(1+\lambda_2)(1+\lambda_3)/(\lambda_2+\lambda_3+\lambda_2\lambda_3)$

3RD $(1+\lambda_2)(1+\lambda_3)/[(1+\lambda_2)(1+\lambda_3)-(1-\lambda_1)]$

4TH
1

5TH
$\lambda_2(1+\lambda_3)/(\lambda_2(1+\lambda_3)+(1-\lambda_1)\lambda_3)$

REV
$\lambda_2(1+\lambda_3)/(\lambda_3 \lambda_1)$

1ST
$(1+\lambda_3)/\lambda_3$

2ND
$(1+\lambda_2)(1+\lambda_3)/(\lambda_2+\lambda_3+\lambda_2\lambda_3)$

3RD
$(1+\lambda_2)(1+\lambda_3)/[(1+\lambda_2)(1+\lambda_3)-(1-\lambda_1)]$

4TH
1

5TH
$\lambda_2(1+\lambda_3)/[\lambda_2(1+\lambda_3)+(1-\lambda_1)\lambda_3]$

REV
$\lambda_2(1+\lambda_3)/(\lambda_3\lambda_1)$

AUTOMATIC TRANSMISSION FOR VEHICLE

BACKGROUND OF THE INVENTION

1. Field of the Invention

The invention relates to an automatic transmission for a vehicle, and more particularly, to an automatic transmission for a vehicle of a type including a planetary gear set having at least four shift elements, and one planetary gear unit, in which rotation input to the planetary gear unit and is transmitted to the shift elements of the planetary gear set.

2. Description of Related Art

An automatic transmission of the above-described type is disclosed in Japanese Patent Laid-open Publication No. HEI 2-129446. The disclosed automatic transmission achieves 5 speeds (or 6 speeds) with less shift elements, resulting in a compact automatic transmission.

An automatic transmission of the above type usually employs a one-way clutch ("OWC", hereinafter) for permitting rotation only in one direction to facilitate shift control. For example, in the automatic transmission disclosed in Japanese Patent Laid-open Publication No. HEI 2-129446, a set of a coast OWC and a clutch is disposed in parallel with a third speed clutch K4 between a planetary gear unit and a planetary gear set. In Japanese Patent Laid-Open Publication No. HEI 4-29650, a third and fifth speed clutch C3 is likewise provided between a planetary gear unit and a planetary gear set.

Generally, both the transmitting side and the receiving side of a clutch are formed as rotors, and the number of rotor members required in a transmission is an inconvenience owing to large clutch size.

Further, the clutch K4 or C3 disposed between the planetary gear unit and the planetary gear set also serves to prevent relative rotational speed between the shift elements of an upstream planetary gear unit from increasing, due to rotation of the planetary gear set, when the clutch is not participating in a shift operation. That is, rotation of an input shaft is directly input to the planetary gear set without passing through the planetary gear unit. However, in such a structure, when the rotation of the input shaft is input to the planetary gear unit in a shift operation, the clutch K4 or C3 accordingly transmits the rotation that has been reduced in speed, with increased torque, by the planetary gear unit to the planetary gear set. However, the capacity of the clutch K4 or C3 must be increased in accordance with the torque to be transmitted, thus undesirably enlarging the clutch size.

SUMMARY OF THE INVENTION

In view of the aforementioned circumstances, it is a first object of the invention to provide an automatic transmission for a vehicle of a type combining a planetary gear unit and a planetary gear set, in which input rotation may be transmitted to the shift elements of the planetary gear set without passing through the planetary gear unit. The automatic transmission according to the invention can be formed into a compact structure by reducing the number of clutches to the extent possible, as well as by reducing the size of the clutch itself.

It is a second object of the invention to provide an automatic transmission for a vehicle of the aforementioned type having a simple and compact structure, which prevents increase in the relative rotational speed between shift elements of a planetary gear unit which is not participating in a shift operation.

According to a first aspect of the invention, there is provided an automatic transmission for a vehicle including an input shaft and an output shaft, a first planetary gear unit, and a planetary gear set having at least four shift elements, in which the planetary gear unit and the planetary gear set cooperate to provide multistage shifting. The first planetary gear unit includes a first shift element to which rotation of the input shaft is input through a first clutch, a second shift element stopped from rotating by a first engagement unit, and a third shift element for outputting, to a fourth shift element of the planetary gear set, rotation that is reduced in speed relative to the rotational speed of the input shaft.

This first aspect of the invention provides a gear train having a first clutch which connects/disconnects the input shaft to/from the first shift element. This gear train has no clutch between shift elements of the planetary gear unit and the planetary gear set. The second shift element is appropriately braked/released by the first engagement unit so as to prevent excessive increase in the relative rotation between shift elements of the first planetary gear unit when not participating in the shift operation as shown in FIG. 13.

Since the first clutch is disposed between the input shaft and the first shift element to which the rotation of the input shaft is transmitted, it is possible to reduce the capacity of the first clutch to be smaller than that of the prior art clutch disposed between the shift elements of the planetary gear unit and the planetary gear set to which reduced rotational speed (thus, greater torque), compared with the rotational speed of the input shaft, is transmitted. Thus, the resultant clutch structure is more compact and the automatic transmission itself can be made more compact.

In a preferred embodiment, the first engagement unit includes a first brake and a first one-way clutch for permitting rotation only in one direction, and the second shift element is connected to the transmission casing and stopped from rotating when the first brake or the first one-way clutch is engaged. The first brake is capable of applying an engine brake (coast) and, therefore, unlike the conventional system, a set of the clutch and the one-way clutch need not be disposed between rotatable elements of the first planetary gear unit and the planetary gear set for coasting, thus simplifying the overall structure and making the automatic transmission more compact.

The first brake is indispensable for preventing the first shift element from rotating at a high speed during idling of the first planetary gear unit. Therefore, the first brake can serve both as the brake that prevents high-speed rotation and as the brake for engine braking. This makes it possible to correspondingly reduce the number of frictional engagement elements. Therefore, the shift control can be easily performed and the automatic transmission can be made into a compact structure.

In another preferred embodiment of the invention, the first shift element is connected to the transmission casing through a second one-way clutch and a second brake, and the second one-way clutch is locked by engaging the second brake so as to stop rotation of a fourth shift element. Thus, in this preferred embodiment of the invention, the fourth shift element is stopped from rotating, with the reaction force borne by the first and second one-way clutches and the second brake (see FIG. 5(b)). Therefore, torque loads on the second one-way clutch and the second brake can be reduced compared with the case where the fourth shift element is directly provided with the second one-way clutch and the second brake (see FIG. 4(b)), thus allowing the automatic transmission to be formed into a more compact structure.

Preferably, the first shift element is connected to the case through a third brake, and the fourth shift element is stopped from rotating by engaging the first brake and the third brake.

In the preferred form of the first aspect of the invention, the fourth shift element is stopped from rotating with the torque borne by the first brake and the third brake. Therefore, the torque load on the third brake can be reduced compared with the case where the fourth shift element is directly provided with the third brake, thus allowing the automatic transmission to be formed into a more compact structure.

According to the preferred embodiment of the first aspect of the invention, the planetary gear set includes four shift elements, the fourth shift element is connected to the third shift element of the first planetary gear unit and can be stopped from rotating by a second engagement unit, a fifth shift element is selectively connected to the input shaft by a second clutch, and can be stopped from rotating by a third engagement unit, a sixth shift element is connected to the output shaft, and a seventh shift element is selectively connected to the input shaft by a third clutch. Thus, the preferred form of the first aspect of the invention provides an automatic transmission with five or six forward speeds in a compact structure, by utilization of the fourth to seventh shift elements.

According to a second aspect of the invention, there is provided an automatic transmission for a vehicle including an input shaft and an output shaft, a first planetary gear unit including one shift element stopped by a first engagement unit, a planetary gear set having at least four shift elements, and a first clutch for transmitting rotation of the input shaft to one of the shift elements of the planetary gear set through the first planetary gear unit, in which one of a plurality of the shift elements is appropriately selected, and rotation of the input shaft is transmitted to the output shaft through the selected shift element so as to achieve a selected speed stage. The first planetary gear unit includes a first shift element to which rotation of the input shaft is input, a second shift element stopped from rotating by the first engagement unit, and a third shift element for outputting rotation at a speed, different from that of the input shaft, to the fourth shift element of the planetary gear set. The first engagement unit includes a first brake and a first one-way clutch for permitting rotation in only one direction. The second shift element is stopped from rotating when the first brake or the first one-way clutch is engaged.

In the second aspect of the invention, the second shift element is stopped from rotating through the first brake and the first one-way clutch disposed between the second shift element and the case. Therefore, the first brake is capable of providing for engine braking. Unlike the conventional system, a set of a clutch and a one-way clutch need not be disposed between the first planetary gear unit and the planetary gear set for coasting. Accordingly, the complicated structure for supporting those mechanisms can be eliminated, thus further contributing to compactness of the automatic transmission.

The first brake is indispensable to prevention of the first shift element from rotating at a high speed during idling of the first planetary gear unit. The first brake can serve both as the brake that prevents high-speed rotation and as the brake for engine braking. This makes it possible to correspondingly reduce the number of frictional engagement elements. Therefore, the shift control can be easily performed and the automatic transmission can be made into a more compact structure.

According to a preferred form of the second aspect of the invention, the first clutch is disposed between the first shift element and the input shaft, the first shift element is connected to the second one-way clutch through a second brake, and the second one-way clutch is locked by engaging the second brake so as to stop the rotation of the fourth shift element.

In the preferred form of the second aspect of the invention, the fourth shift element is stopped from rotating with the reaction force borne by the first and second one-way clutches and the second brake (see FIG. 5(b)). Therefore, the torque load on the second one-way clutch and the second brake can be reduced compared with the case where the fourth shift element is directly connected to the second one-way clutch and the second brake (see FIG. 4(b)), thus allowing the automatic transmission to be formed into a more compact structure.

Also, according to a preferred form of the second aspect of the invention, the first clutch is disposed between the first shift element and the input shaft, the first shift element is connected to a case through a third brake, and the fourth shift element is stopped from rotating by engaging the first brake and the third brake.

Further, in the preferred form of the second aspect of the invention, the fourth shift element is stopped from rotating with the torque borne by the first brake and the third brake. Therefore, the torque load on the third brake can be reduced compared with the case where the fourth shift element is directly connected to the third brake, thus allowing the automatic transmission to be formed into a more compact structure.

In the preferred form of the second aspect of the invention, the first planetary gear unit outputs reduced rotation from the third shift element (R1) when the second shift element (CR1) is stopped from rotating by the first engagement unit.

In the preferred form of the second aspect of the invention, reduced rotation can be input to the planetary gear set in addition to rotation of the dual system input shaft. Therefore, as the number of multi-gear stages increases, it is possible to provide more speed change paths within the planetary gear set as shown in the velocity diagram for the planetary gear set. This gives enhanced flexibility in gear ratios and allows employment of an optimum gear ratio.

In the preferred form of the second aspect of the invention, the planetary gear set includes four shift elements, the fourth shift element is connected to the third shift element of the first planetary gear unit, and the rotation of the fourth shift element at least in one direction, is stopped by the second engagement unit, a fifth shift element is selectively connected to the input shaft by a second clutch, and the rotation of the fifth shift element at least in one direction, is stopped by the third engagement unit, a sixth shift element is connected to the output shaft, and a seventh shift element is selectively connected to the input shaft by a third clutch. Thus, in the preferred form of the second aspect of the invention, an automatic transmission of five or six forward speeds can be formed into a compact structure by utilizing fourth to seventh shift elements.

According to a third aspect of the invention, there is provided an automatic transmission for a vehicle including an input shaft and an output shaft, a first planetary gear unit, and a planetary gear set having at least four shift elements, in which the planetary gear unit and the planetary gear set cooperate to provide multistage shifting. The first planetary gear unit includes a first shift element to which rotation of the input shaft is input through a first clutch, a second shift element stopped from rotating by a first one-way clutch or a first brake, and a third shift element for outputting, to a fourth shift element of the planetary gear set, rotation at a speed that is reduced relative to the rotational speed of the input shaft. The second shift element is stopped from rotating when the first brake or the first one-way clutch is engaged.

In this third aspect of the invention, the first clutch connects/disconnects the input shaft to/from the first shift element without a clutch provided between shift elements of the planetary gear unit and the planetary gear set, and the second shift element is appropriately stopped/released using the first one-way clutch and the first brake so as to prevent excessive increase in the relative rotational speed between shift elements of the first planetary gear unit when not participating in a shift operation, as shown in FIG. 13.

Further, since the first clutch is disposed between the input shaft and the first shift element to which the rotation of the input shaft is transmitted, it is possible to reduce the capacity of the first clutch to be smaller than that of a clutch disposed between the shift elements of the planetary gear unit and the planetary gear set to which rotation at a reduced speed (thus, greater torque), compared with the rotational speed of the input shaft, is transmitted. The resultant clutch structure, thus, can be formed into a more compact structure.

Further, according to a preferred form of the third aspect of the invention, the first clutch is disposed between the first shift element and the input shaft, the first shift element is connected to a case through the second one-way clutch and a second brake, and the second one-way clutch is locked by engaging the second brake so as to stop the rotation of the fourth shift element.

In the preferred form of the third aspect of the invention, the fourth shift element is stopped from rotating with the reaction force borne by the first and the second one-way clutch and the second brake (see FIG. 5(b)). Therefore, the torque load on the second one-way clutch and the second brake can be reduced compared with the case where the fourth shift element is directly connected to the second one-way clutch and the second brake (see FIG. 4(b)), thus allowing the automatic transmission to be formed into a more compact structure.

According to a preferred form of the third aspect of the invention, the first shift element is connected to a case through a third brake, and the fourth shift element is stopped from rotating by engaging the first brake and the third brake.

Also, in the preferred form of the third aspect of the invention, the fourth shift element is stopped from rotating with the torque borne by the first brake and the third brake. Therefore, the torque load on the third brake can be reduced compared with the case where the fourth shift element is directly connected to the third brake, thus allowing the automatic transmission to be formed into a more compact structure.

According to a preferred form of the third aspect of the invention, the first planetary gear unit outputs rotation at a reduced speed from the third shift element when the second shift element is stopped from rotating by the first engagement unit.

In the preferred form of the third aspect of the invention, reduced rotation can be input to the planetary gear set in addition to rotation of the dual system input shaft. Therefore, as the number of multi-gear stages increases, it becomes possible to prove more options in the velocity diagram on the side of the planetary gear set. This, in turn, provides enhanced flexibility of gear ratio and allows employment of a more optimum gear ratio.

According to a preferred form of the third aspect of the invention, the planetary gear set includes four shift elements, the fourth shift element is connected to the third shift element of the first planetary gear unit, and the fourth shift element can be stopped from rotating by a second engagement unit, a fifth shift element is selectively connected to the input shaft by a second clutch, and can be stopped from rotating by a third engagement unit, a sixth shift element is connected to the output shaft, and a seventh shift element is selectively connected to the input shaft by a third clutch. Thus, in the preferred form of the third aspect of the invention, an automatic transmission of five or six forward speeds can be formed into a compact structure by employing the fourth to the seventh shift elements.

BRIEF DESCRIPTION OF THE DRAWINGS

FIG. 1(a) is a table of operations of frictional engagement elements correlated with speed stages, gear ratios and gear ratio steps, in accordance with an embodiment of the present invention.

FIG. 2(a) is a table of operations of frictional engagement elements with a second embodiment of the present invention.

FIG. 3(a) is a table of operations of frictional engagement elements with a third embodiment of the present invention.

DETAILED DESCRIPTION OF PREFERRED EMBODIMENTS

Figure 1B:
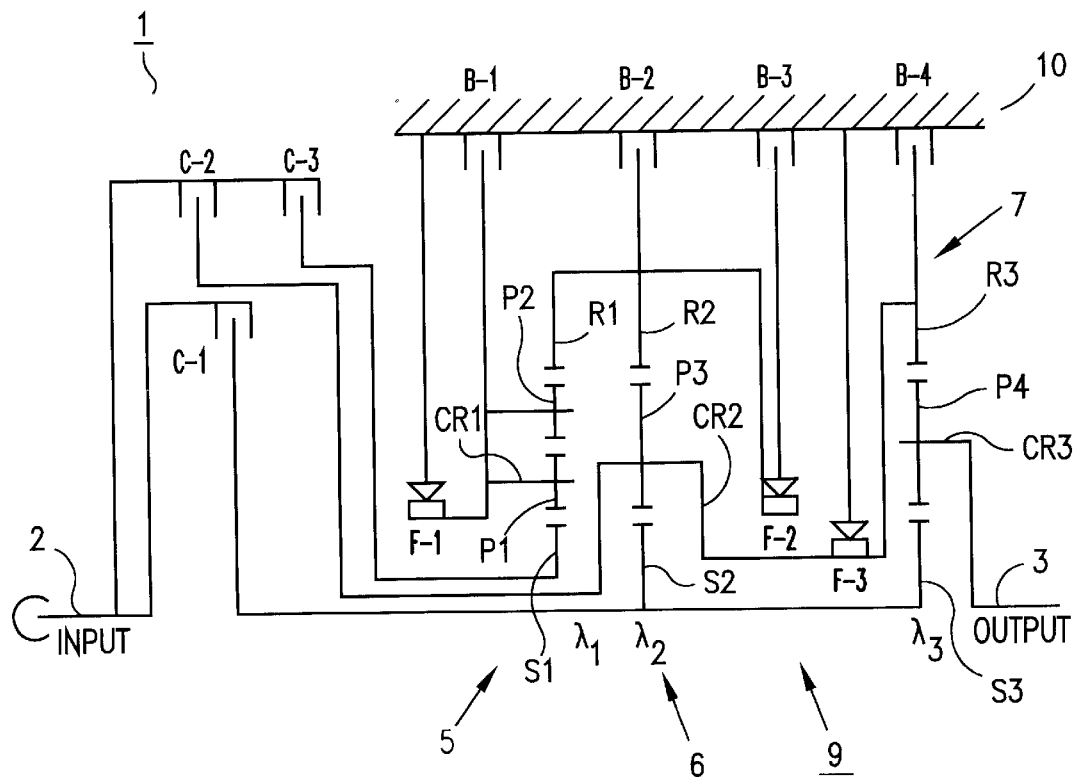
FIG. 1(b) is a skeletal diagram of an embodiment of an automatic transmission of the present invention operable according to FIG. 1(a)

FIGS. 1(a) and 1(b) show a first embodiment of an automatic transmission 1 for a vehicle according to the present invention as including an input shaft 2 connected to an engine output shaft through a torque converter, and an output shaft 3 connected to wheels. A front planetary gear unit 5 including a dual planetary gear unit and a rear planetary gear set 9, the latter including two simple planetary gear units, i.e., a middle planetary gear unit 6 and a rear planetary gear unit 7, are disposed between the input shaft 2 and the output shaft 3.

The front planetary gear unit 5, constituting a first planetary gear unit, includes a sun gear S1 connected to the input shaft 2 through a clutch C-3. The sun gear S1 meshes with a pinion P1, which is meshed with a pinion P2 which, in turn, is meshed with a ring gear R1. The pinions P1, P2 are supported by a carrier CR1. The carrier CR1 is connected to a one-way clutch F-1 provided in a gear case 10 and a brake B-1, which constitute a first engagement unit.

The middle planetary gear unit 6 of the rear planetary gear set 9 is closer to the front planetary gear unit 5 and includes a sun gear S2 connected to the input shaft 2 through a clutch C-1. The sun gear S2 meshes with a pinion P3 in mesh with a ring gear R2. The pinion P3 is supported by a carrier CR2, to which the input shaft 2 is connected through a clutch C-2. The ring gear R1 of the front planetary gear unit 5 is connected (fixed) to the ring gear R2. These ring gears R1 and R2 can be stopped from rotating by engagement of a brake B-2, a component of the second engagement unit. Similarly, the ring gears R1 and R2 can be stopped from rotating through a one-way clutch F-2 and a brake B-3 connected to the gear case 10 and constituting the second engagement unit together with the brake B-2.

The rear planetary gear unit 7 of the rear planetary gear set 9 which is closer to the output shaft 3 includes a sun gear S3 which can be integrally connected to the input shaft 2 through the clutch C-1 so that the sun gear S3 rotates in synchronization with the sun gear S2. The sun gear S3 meshes with a pinion P4 in mesh with a ring gear R3. The ring gear R3 is connected to the carrier CR2 of the middle planetary gear unit 6. The ring gear R3 can be stopped from rotating through a one-way clutch F-3 and a brake B-4 provided in the gear case 10 and constituting a third engagement unit. The pinion P4 is supported by a carrier CR3, and the output shaft 3 is connected to the carrier CR3.

In this first embodiment, the rear planetary gear set 9 has four shift elements, i.e., a shift element including the sun gears S2, S3 connected to each other and to the input shaft 2, a shift element including the carrier CR2 of the middle planetary gear unit 6 and the ring gear R3 of the rear planetary gear unit 7, a fourth shift element including the ring gear R2 connected to the ring gear R1 that is an output member of the front planetary gear unit 5, and a shift element including the carrier CR3 to which the output shaft 3 is connected.

Next, operation of the automatic transmission 1 will be explained with reference to the Table of FIG. 1(a), the torque transmission diagram of FIG. 4 and the velocity diagram of FIG. 6. In the velocity diagram in FIG. 6, vertical lines at the right side correspond to the shift elements of the rear planetary gear set 9 respectively representing the fourth, fifth, sixth and seventh shift elements from the left end in FIG. 1(b).

Figure 4A:
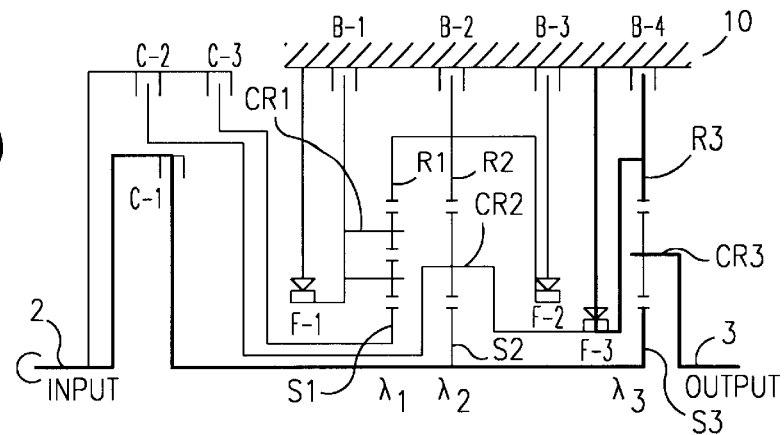
FIGS. 4(a)–4(f) are diagrams of torque transmission paths at the respective speeds of the automatic transmission shown in FIG. 1.

In first speed, as shown in FIG. 1(a), the clutch C-1 is engaged, the one-way clutch F-3 is actuated, the input shaft 2 is connected to the sun gears S2, S3, and reverse rotation of the ring gear R3 is prevented by the one-way clutch F-3. As shown in FIGS. 4(a) and 6, rotation (RIN) of the input shaft 2 is directly input to the sun gear S3 of the rear planetary gear set 9 through the clutch C-1. Then, the ring gear R3 is brought from a stationary state to the state as shown by a line L1 in the velocity diagram of FIG. 6. The first forward speed 1ST is output from the carrier CR3 to which the output shaft 3 is connected. At that time, the middle planetary gear unit 6 is in an idling state due to rotation of the sun gear S2.

Assuming that the gear ratio of the rear planetary gear unit 7 is expressed by the equation $\lambda_3=Z_{S3}/Z_{R3}$, where $Z_{S3}$ is the number of teeth of the sun gear S3, and $Z_{R3}$ is the number of teeth of the ring gear R3, the gear ratio at this time is $(1+\lambda_3)/\lambda_3$. If $Z_{S3}=32$ and $Z_{R3}=80$ are substituted, $\lambda_3=0.4000$, and the first speed gear ratio becomes $(1+0.4)/0.4$ or 3.500 as shown in FIG. 1(a).

Figure 4B:
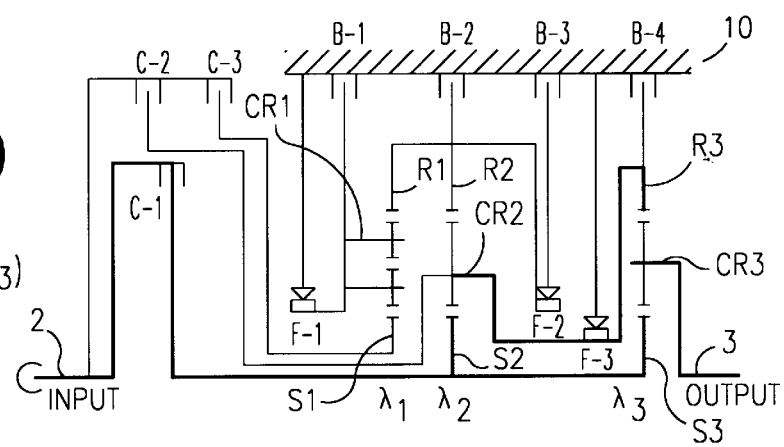

In second speed, as shown in FIG. 1(a), the brake B-3 is engaged in addition to the engagement of the clutch C-1 previously engaged in first speed, and the one-way clutch F-3 is released, and the one-way clutch F-2 is actuated. In this state, the ring gear R2 of the middle planetary gear unit 6 that has been in the idling state is stopped from rotating by the brake B-3 and the one-way clutch F-2. In this state, as shown in FIG. 4(b), rotation of the input shaft 2 is input to the sun gear S2 of the middle planetary gear unit 6, and also input to the sun gear S3 of the rear planetary gear unit 7. However, the ring gear R2 is stopped, i.e., the rotation thereof is prevented (speed=0). The state represented by line L2 in the velocity diagram in FIG. 6 is established, and rotation of the second forward speed 2ND is output from the carrier CR3 to which the output shaft 3 is connected.

Assuming that the gear ratio of the middle planetary gear unit 6 is in accordance with the equation of $\lambda_2=Z_{S2}/Z_{R2}$, where $Z_{S2}$ is the number of teeth of the sun gear S2, and $Z_{R2}$ is the number of teeth of the ring gear R2, the overall gear ratio can be expressed by the equation $(1+\lambda_2)(1+\lambda_3)/(\lambda_2+\lambda_3+\lambda_2\lambda_3)$. If $Z_{S2}=31$ and $Z_{R2}=73$ are substituted, $\lambda_2=0.4247$. The gear ratio of the second speed becomes 2.006 as shown in FIG. 1(a) given the aforementioned value of $\lambda_3$, i.e., $\lambda_3=0.4$.

In third speed, as shown in FIG. 1(a), the clutch C-3 is engaged in addition to the previous engagement of the clutch C-1 at the first and the second speeds, the one-way clutch F-2 is released, and the one-way clutch F-1 is actuated. In this state, rotation of the input shaft 2 is input to the rear planetary gear set 9 through the clutch C-1 and also to the sun gear S3 of the front planetary gear unit 5 through the clutch C-3. Reverse rotation of the carrier CR1 is prevented by the one-way clutch F-1 connected to the case 10, and the carrier CR1 is locked to the case 10 and stopped from rotating.

Figure 4C:
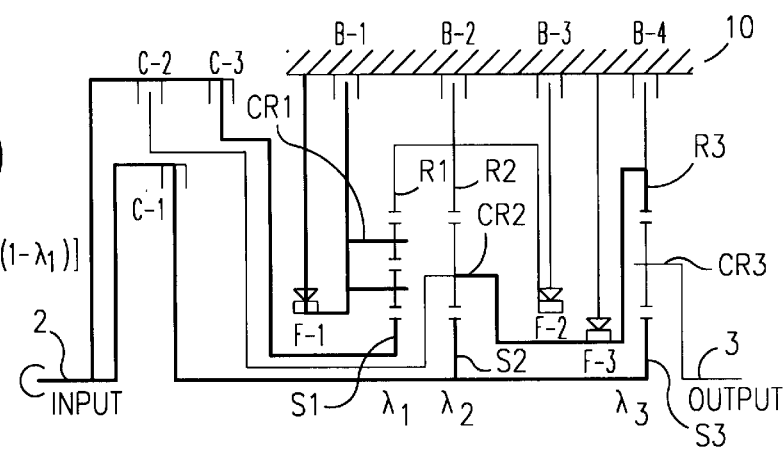
Figure 4D:
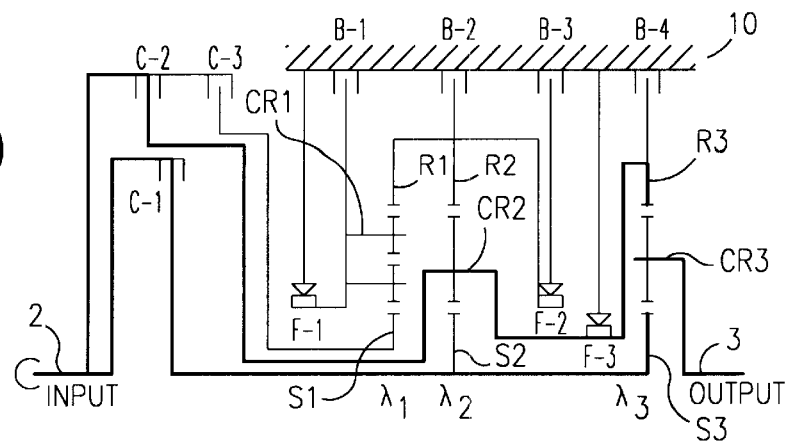
Figure 4E:
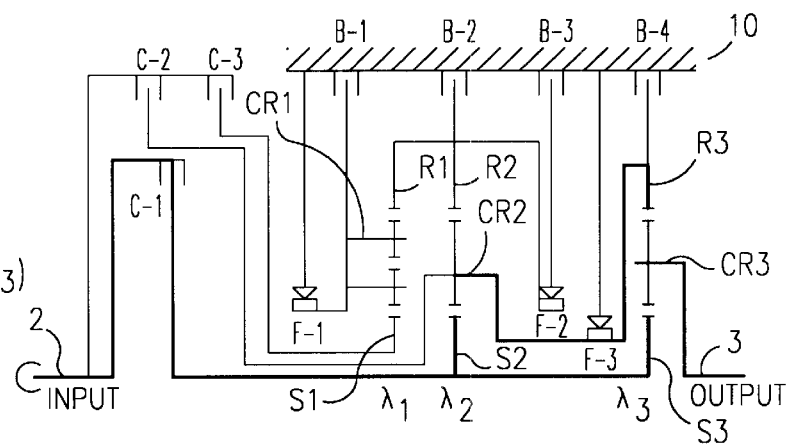
Figure 4F:
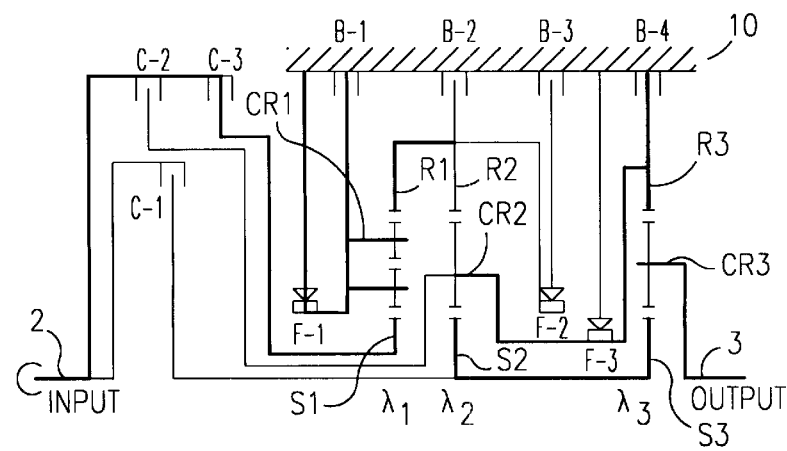

Then, rotation of the input shaft 2 is input to the sun gear S1 in the front planetary gear unit 5, and the carrier CR1 is stopped from rotating. Therefore, the state represented by line L3 in the velocity diagram in FIG. 6 is established, and the reduced forward rotation RV1 is output from the ring gear R1, serving as the output member, to the ring gear R2 of the middle planetary gear unit 6. As the rotation RIN of the input shaft 2 is input to the sun gears S2, S3 in the rear planetary gear set 9 as shown in FIG. 4(c), the rotation RV1 input from the front planetary gear unit 5 to the ring gear R2 is synthesized as represented by line L4 of the velocity diagram in FIG. 6. The third speed 3RD is thus output from the carrier CR3 to which the output shaft 3 is connected. At this time, the brake B-3 is in the engaged state and, as the one-way clutch F-2 is in the idling state, the brake B-3 does not participate in a shifting operation.

Assuming that the gear ratio of the front planetary gear unit 5 is obtained by the equation of $\lambda_1=Z_{S1}/Z_{R1}$, where $Z_{S1}$ is the number of teeth of the sun gear S1, and $Z_{R1}$ is the number of teeth of the ring gear R1, the overall gear ratio at that time is obtained by the equation of $(1+\lambda_2)(1+\lambda_3)/\{(1+$ $\lambda_2)(1+\lambda_3)-(1-\lambda_1)\}$. If $Z_{S1}=39$ and $Z_{R2}=91$ are substituted, the value of $\lambda_2$, becomes 0.4286. The gear ratio of the third speed becomes 1.402 as shown in FIG. 1(a) given the aforementioned values for $\lambda_2$ and $\lambda_3$.

In fourth speed, as shown in FIG. 1(a), the clutch C-2 is engaged in addition to the engagement of the clutch C-1 previously engaged in the first, second and third speeds, and the one-way clutch F-1 is released. In this state, rotation of the input shaft 2 is input to the sun gears S2, S3 of the rear planetary gear set 9 through the clutch C-1 and also to the carrier CR2/ring gear R3 of the rear planetary gear set 9 through the clutch C-2. Members constituting the rear planetary gear set 9 are rotated through direct connection, and the state represented by a line L5 in FIG. 6 is established. The fourth speed 4TH is thus output from the carrier CR3 through the output shaft 3 to which it is connected.

At this time ($4^{th}$ speed), the clutch C-3 and the brake B-3 are both engaged as shown in FIG. 1(a). Rotation of the input shaft 2 is transmitted to the sun gear S1 in the front planetary gear unit 5, and the middle planetary gear unit 6 and the input shaft 2 are directly connected for forward rotation. Therefore, rotation of the input shaft 2 is also input to the ring gear R1 connected to the ring gear R2, the state shown by a line L6 in FIG. 6 is established, and the front planetary gear unit 5 idles in the directly connection state. As the rear planetary gear set 9 is rotated in the directly connected state, the gear ratio in fourth speed becomes 1.

In fifth speed, as shown in FIG. 1(a), the clutch C-1 is disengaged, the clutches C-2, C-3 remain engaged, and the brake B-1 is engaged. In this state, rotation of the input shaft 2 is input to the carrier CR2/ring gear R3 of the rear planetary gear set 9 through the clutch C-2, and is also input to the sun gear S1 of the front planetary gear unit 5 through the clutch C-3. Then, since the carrier CR1 is held against rotation by the brake B-1, the front planetary gear unit 5 is brought into the state represented by line L3 in FIG. 6, and reduced forward rotation RV1 is output from the ring gear R1 to the ring gear R2 of the rear planetary gear set 9. As described above, rotation of the input shaft 2 is input to the carrier CR2/ring gear R3 of the rear planetary gear set 9 and thus the state represented by line L7 in FIG. 6 is established. The fifth speed 5TH is output from the carrier CR3 to the output shaft 3.

In $5^{TH}$ speed, the brake B-3 is engaged as shown in FIG. 1(a). However as the one-way clutch F-2 is in an idling state, the brake B-3 does not participate in shift operation.

The gear ratio in $5^{th}$ speed is obtained by the following equation of $\lambda_2(1+\lambda_3)/\{\lambda_2(1\lambda_3)+1-\lambda_1)\lambda_3)\}$, and the gear ratio of the fifth speed becomes 0.722 as shown in FIG. 1(a), given the aforementioned values for $\lambda_1$, $\lambda_2$ and $\lambda_3$.

In sixth speed, as shown in FIG. 1(a), the clutch C-3 is disengaged and the brake B-2 is engaged. In this state, rotation RIN of the input shaft 2 is input to the carrier CR2/ring gear R3 of the rear planetary gear set 9 through the clutch C-2, and the ring gear R2 is stopped from rotating by the brake B-2. Therefore, the rear planetary gear set 9 is brought into the state represented by a line L8 in FIG. 6. The rotation at the sixth speed 6TH is output from the carrier CR3 to the output shaft 3.

In shifting into sixth speed, the brakes B-1, B-3 are engaged as shown in FIG. 1(a). As the ring gear R1 is stopped from rotating by the brake B-2, the front planetary gear unit 5 is not rotated. The brakes B-1, B-3 do not participate in the shift.

In the reverse gear stage, the clutch C-3 is engaged, and the brake B-4 and the one-way clutch F-1 are engaged as shown in FIG. 1(a). In this state, rotation RIN of the input shaft 2 is input to the sun gear S1 of the front planetary gear unit 5 through the clutch C-3, and the carrier CR1 is stopped from rotating by the one-way clutch F-1. Therefore, the state represented by the line L3 in FIG. 6 is established wherein forward output rotation RV1 is output from the ring gear R1 to the ring gear R2 of the rear planetary gear set 9. Since the ring gear R3/carrier CR2 are stopped from rotating by the brake B-4, the rear planetary gear set 9 is brought into the state represented by line L10 in FIG. 6. The reverse rotation REV is thus output from the carrier CR3 to the output shaft 3.

The reverse gear ratio is obtained by the equation of $\lambda_2(1+\lambda_3)/\lambda_3\lambda_1$ and becomes 3.468 as shown in FIG. 1(a) given the aforementioned values for $\lambda_1$, $\lambda_2$ and $\lambda_3$.

In engine braking (coast), as shown in FIG. 1(a), at the third speed, the brake B-1 connected to the case 10 is engaged to connect the carrier CR1 to the case 10 to thereby prevent rotation thereof. The third speed, then, can reliably be established in accordance with the velocity diagram shown in FIG. 6. The one-way clutch F-1 is disposed between the case 10, and, unlike the conventional technology, the set of the clutch and one-way clutch need not be disposed between two assemblies of rotary elements such as the front planetary gear unit 5 and the planetary gear set 9 for coasting. This makes it possible to eliminate a complicated supporting mechanism for such a clutch set, and the automatic transmission can be formed into a correspondingly more compact structure.

At the second speed, the brake B-2 is engaged to connect the ring gear R2 to the case 10 thereby holding it against rotation. In first speed, the brake B-4 is engaged so as to reliably stop rotation of the ring gear R3.

In the aforementioned embodiment, the brake B-3 and the one-way clutch F-2, as the engaging means for the ring gear R2 of the rear planetary gear set 9, connect directly to the ring gear R2. The brake B-3 and the one-way clutch F-2 may be disposed at any position so long as the ring gear R2 can be stopped from rotating. For example, as shown in FIG. 2, it is possible to dispose the brake B-3 and the one-way clutch F-2 between the clutch C-3 and the sun gear S1 of the front planetary gear unit 5 so as to stop the rotation of the ring gear R2 through the front planetary gear unit 5.

A second embodiment of an automatic transmission according to the present invention is shown in FIG. 2. The structure and operation of this automatic transmission are the same as those shown in FIG. 1 except for the arrangement of the brake B-3 and the one-way clutch F-2 (the velocity diagram is also the same as that shown in FIG. 6)). Therefore, only those portions of the automatic transmission of this second embodiment which are different from those of the automatic transmission 1 shown in FIG. 1 will be explained. Elements similar to those of the automatic transmission 1 shown in FIG. 1 are designated with the same reference numerals, and explanation thereof will be omitted.

Figure 2B:
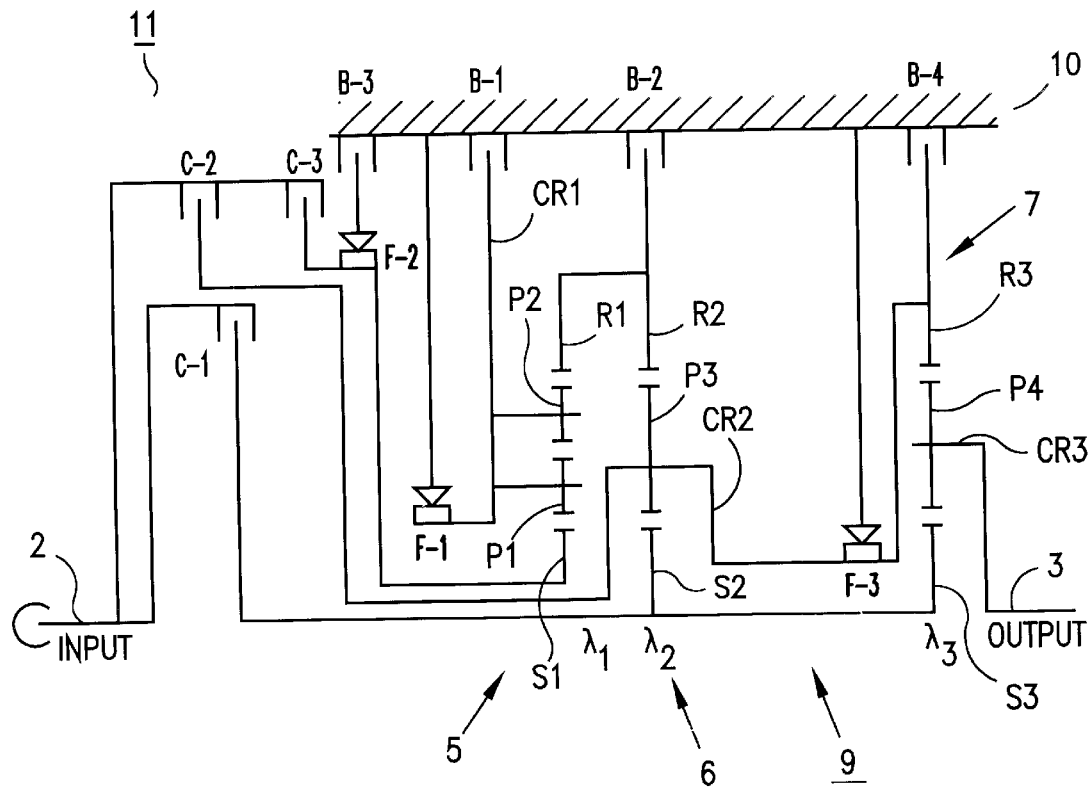
FIG. 2(b) is a skeletal diagram of the second embodiment of the invention.
Figure 5A:
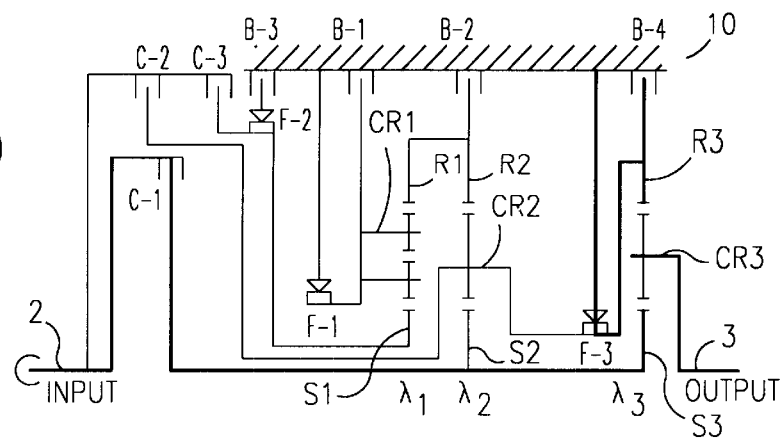
FIGS. 5(a)–5(f) are diagrams of torque transmission paths at the respective speeds of the automatic transmission shown in FIG. 2.
Figure 5B:
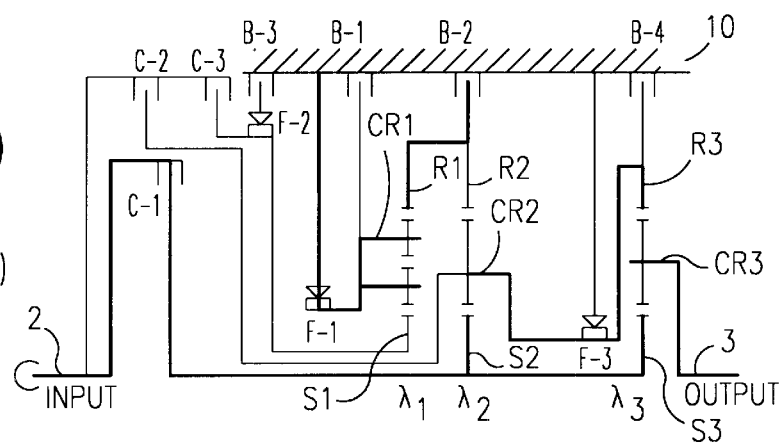
Figure 5C:
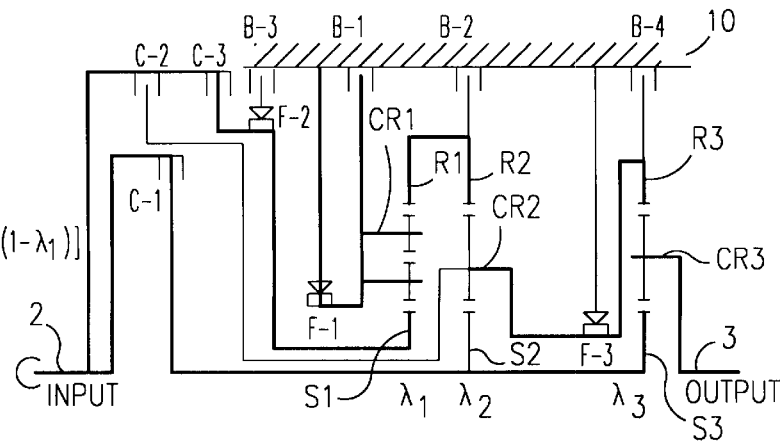
Figure 5D:
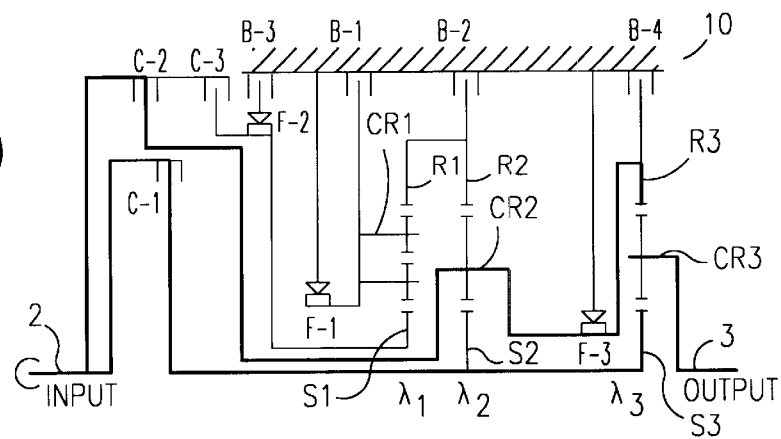
Figure 5E:
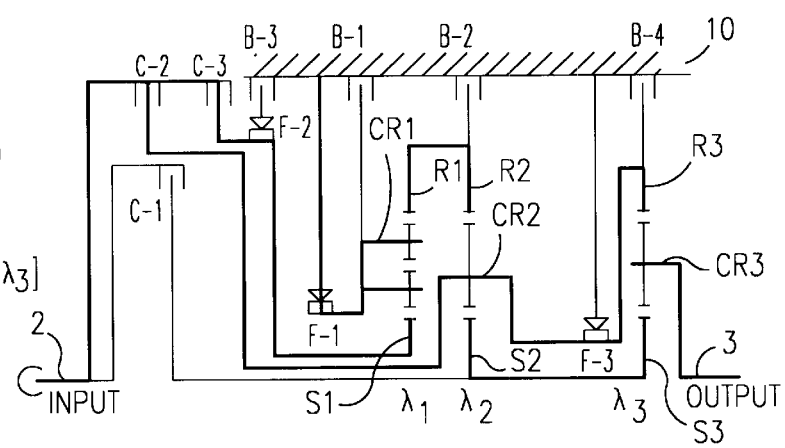
Figure 5F:
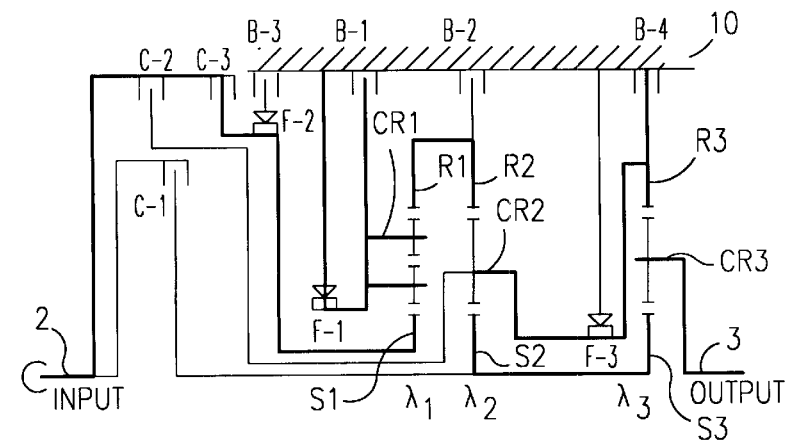

The automatic transmission 11 shown in FIG. 2(b) has a one-way clutch F-2 and a brake B-3 disposed between a sun gear S1 and case 10. A clutch C-1, the brake B-3, and one-way clutches F1, F2 are actuated as shown in FIG. 2(a) for output of the second speed from output shaft 3 of the automatic transmission 11. As shown in FIG. 2(a), in addition to continuation of the previous engagement of the clutch C-1 in first speed, the brake B-3 is engaged, the one-way clutch F-3 is released, and the one-way clutches F-1 and F-2 are actuated. In this state, as shown in FIG. 5(b), the ring gear R2 of middle planetary gear unit 6 that has been in the idling state is stopped from rotating by the sun gear S1 which, in turn, has been stopped from rotating by the one-way clutch F-2 that has been brought into a locked state by actuating the brake B-3. Further, the carrier CR1 is stopped from rotating by the locked one-way clutch F-1.

In this state, as shown in FIG. 5(b), rotation of the input shaft 2 is input to the middle planetary gear unit 6 from the sun gear S2, and input to sun gear S3 of rear planetary gear unit 7. However, since the ring gear R2 is prevented from rotation (speed=0), the state represented by line L2 of the velocity diagram in FIG. 6 is established. The second forward speed $2^{ND}$ is output from the carrier CR3 to which the output shaft 3 is connected.

The torque of the ring gear R2 from stoppage of the carrier CR1 is borne by the one-way clutch F-1, and rotation of the sun gear S1 is stopped from rotating by the brake B-3 through the one-way-clutch F-2. In this way, the ring gear R2 is reliably prevented from rotating by the carrier CR1 and the sun gear S1 which have been stopped from rotating, and the torque thereof is borne by the respective shift elements. In this manner, the torque capacity of each of the oneway clutch F-2 and the brake B-3 can be reduced in accordance with the torque capacity of the one-way clutch F-1. It is possible to reduce the torque load as compared with the case where the one-way clutch F-2 and the brake B-3 are connected directly to the ring gear R2 and, therefore, the one-way clutch F-2 and the brake B-3 can be formed into a more compact structure.

The torque transmitting path and actuation of friction engagement elements such as clutches, brakes and one-way clutches at the speed stages other than second speed are the same as those of the automatic transmission 1 shown in FIG. 1, and the gear ratios are also the same.

Figure 3B:
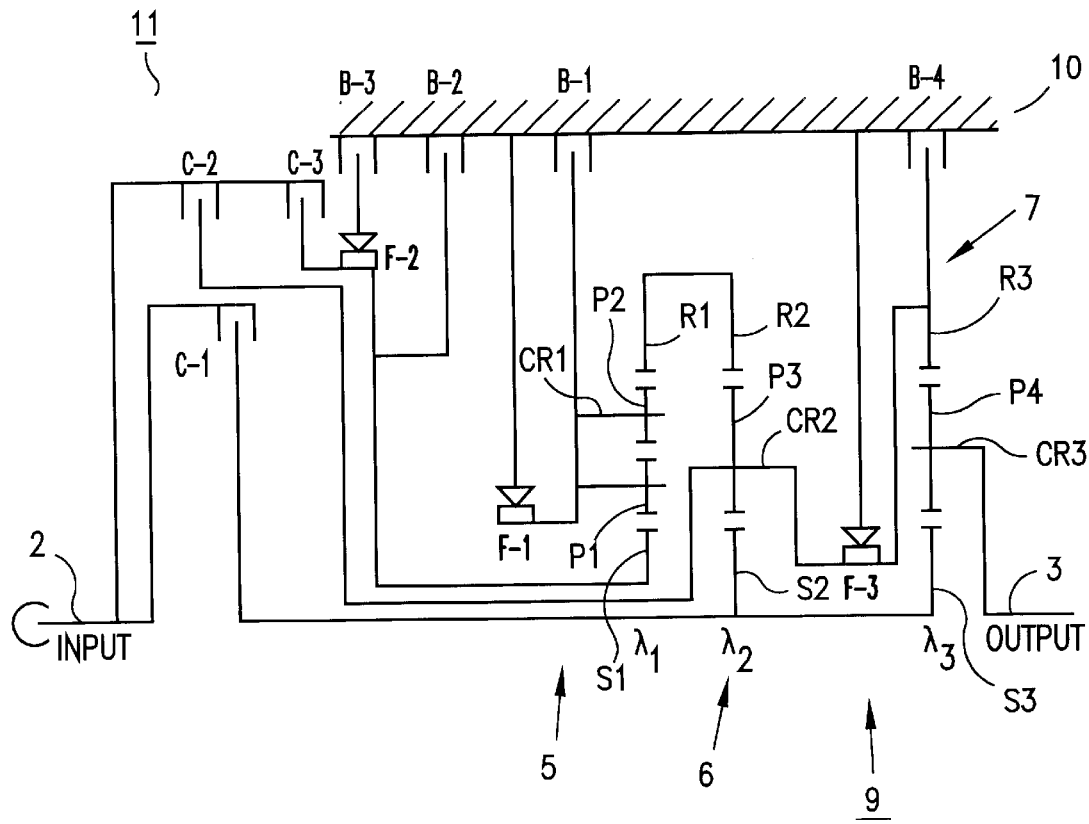
FIG. 3(b) is a skeletal diagram of the third embodiment of the invention.

In a third embodiment, shown in FIG. 3(b), the brake B-2 for engine braking in second speed is likewise disposed between the sun gear S1 of the front planetary gear unit 5 and the gear case 10. During engine braking at the second speed, as shown in FIG. 3(a), the brake B-1 for the fifth speed is actuated in addition to the brake B-2 that is first actuated for engine braking. The ring gear R2 is stopped from rotating by the brakes B-1 and B-2 through the front planetary gear unit 5, thus making it possible to reduce the torque load on the brake B-2 and to form the brake B-2 with a more compact structure. That is, rotation of the ring gear R2 is stopped by stopping the carrier CR1 through engagement of the brake B-1, stopping the sun gear S1 by engagement of the brake B-2, and stopping rotation of both the shift elements, thereby stopping the entire front planetary gear unit 5. Since the torque is borne by both of the brakes B-1 and B-2, it is possible to reduce the torque capacity of the brake B-2 and to form the brake B-2 into a more compact structure as compared with the case where the brake B-2 is directly connected to the ring gear R2.

Figure 9A:
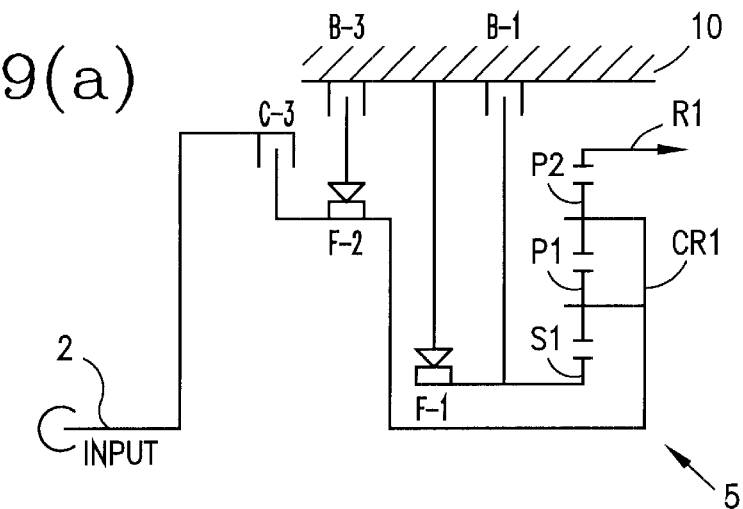
FIG. 9 shows skeletal diagrams representing a further example of the front planetary gear unit.
Figure 9B:
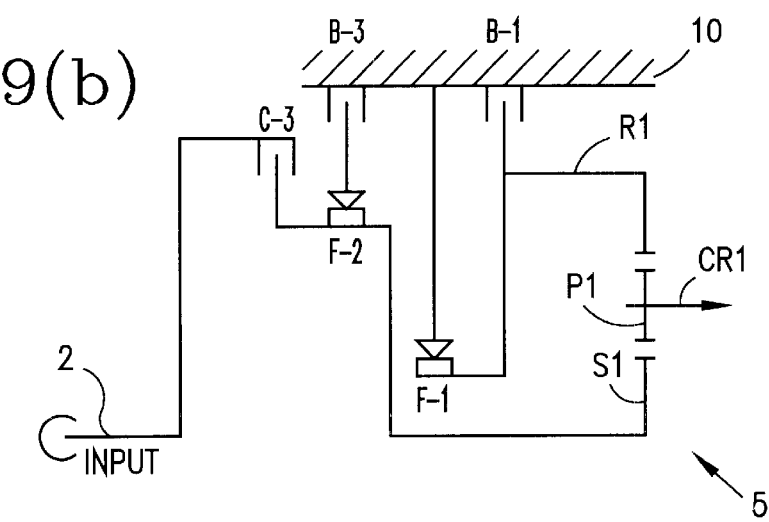
Figure 9C:
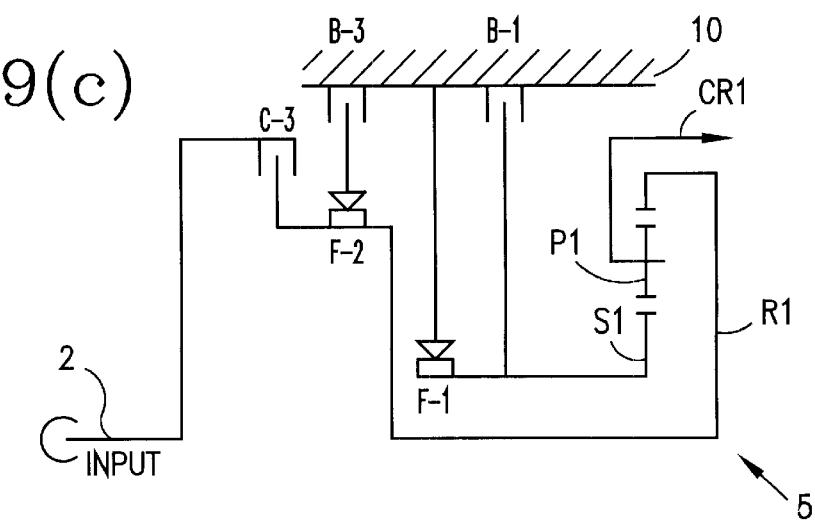

In this embodiment, the front planetary gear unit 5 is of a dual type in which two pinions P1, P2 are meshed in series between the sun gear S1 and the ring gear R1. However, the front planetary gear unit 5 may be of a simple type in which one pinion is disposed between the sun gear S1 and the ring gear R1 as shown in FIGS. 9(b) and 9(c).

Figure 10:
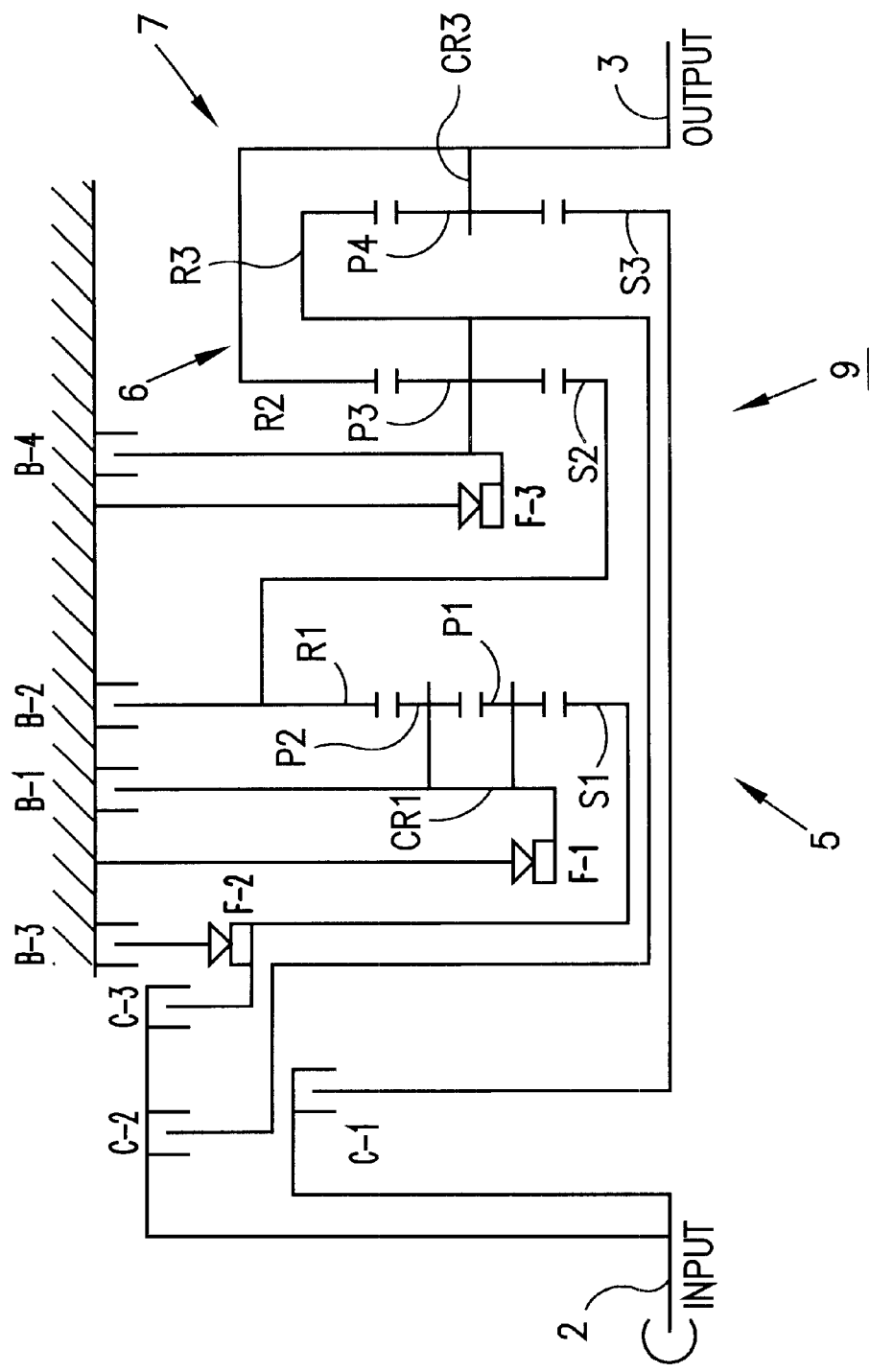
FIG. 10 is a skeletal diagram showing another example of a planetary gear set.
Figure 11:
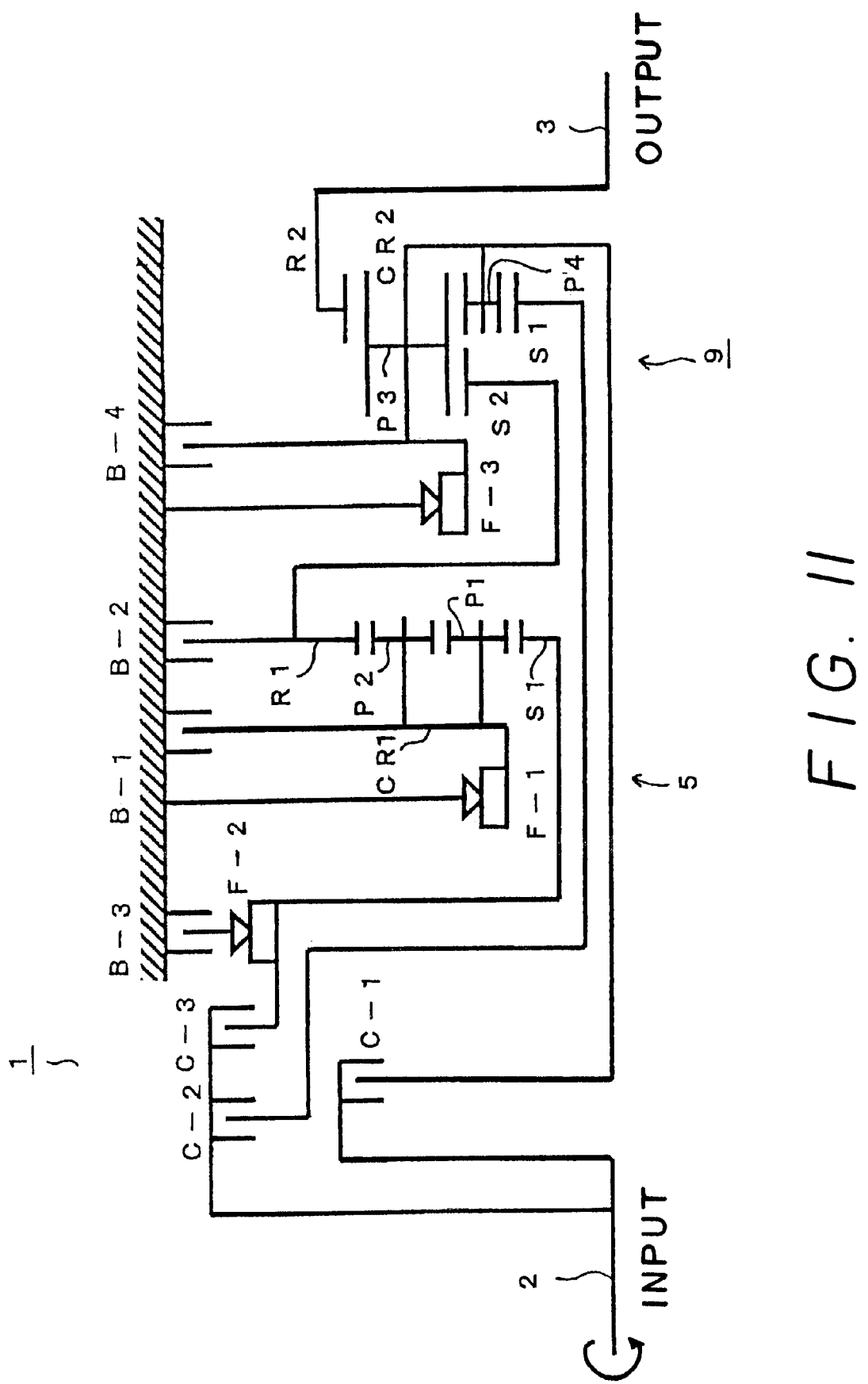
FIG. 11 is a skeletal diagram showing a further example of the planetary gear set.
Figure 12:
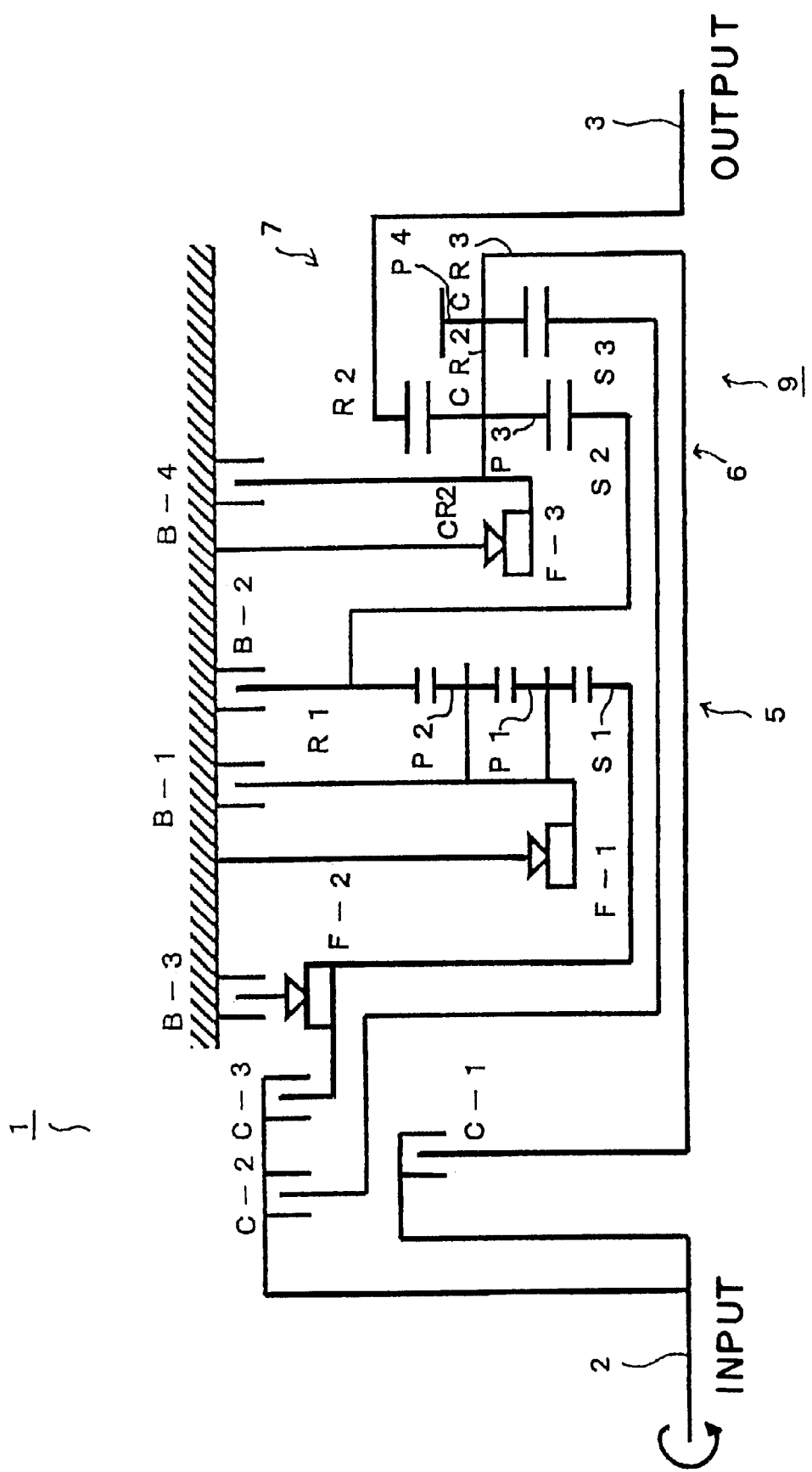
FIG. 12 is a skeletal diagram showing a still further example of the planetary gear set.

The rear planetary gear set 9 is not limited to the type described in connection with the foregoing embodiments. Alternatively, it may be of the Ravigneaux type as shown in FIG. 11, CR-CR type as shown in FIG. 10, or a stepped pinion type as shown in FIG. 12, so long as the rear planetary gear set 9 has at least four shift elements.

The roles of the brake B-1 connecting to the carrier CR1 of the front planetary gear unit 5 and the clutch C-3 disposed between the sun gear S1 and the input shaft 2 in the automatic transmission 11 shown in FIG. 2(b) will now be explained in detail.

Figure 6:
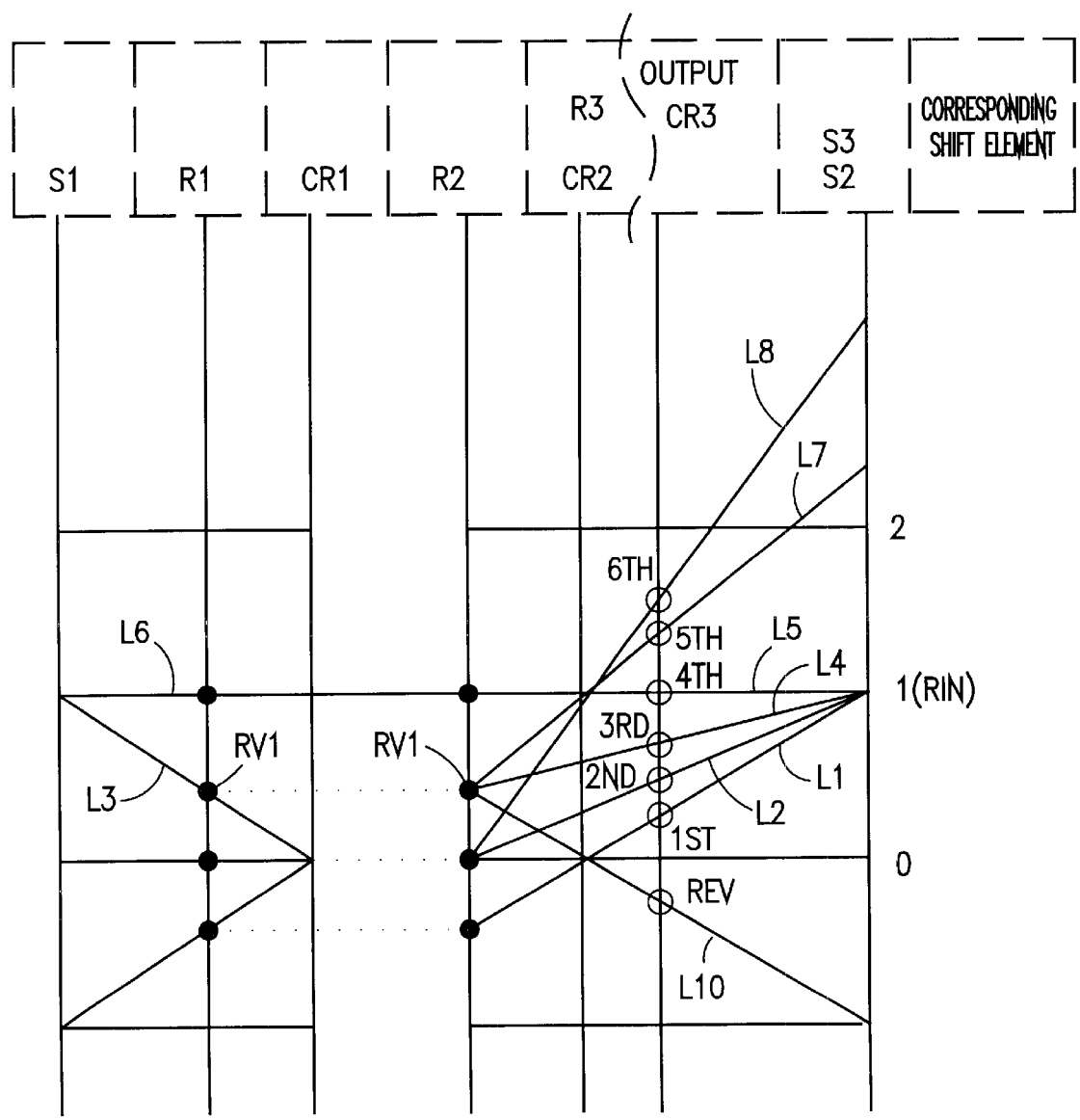
FIG. 6 is a velocity diagram for the automatic transmissions shown in FIGS. 1 to 3.
Figure 13:
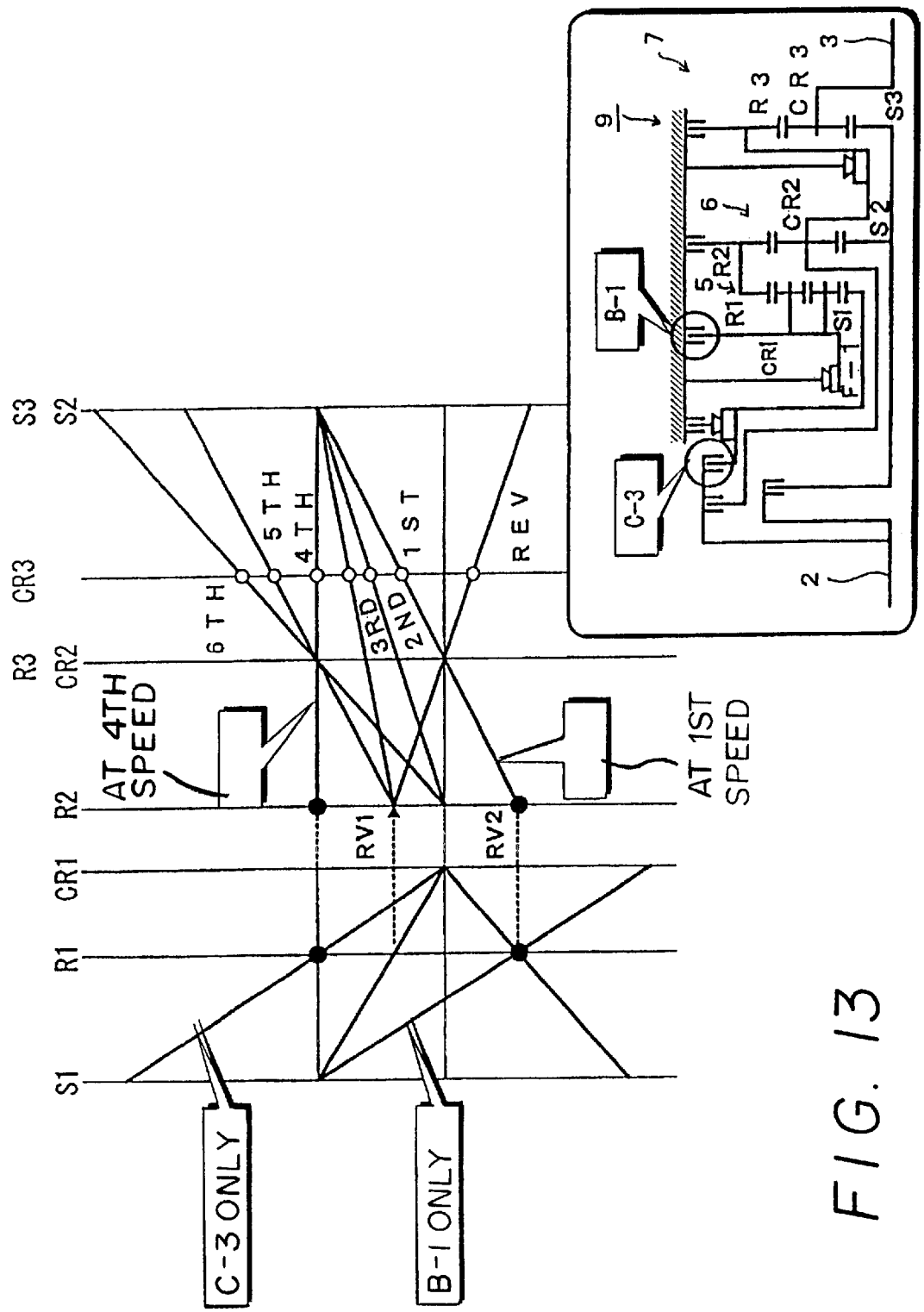
FIG. 13 is a velocity diagram representing correlation between the clutch of the front planetary gear unit and the brake of the automatic transmission shown in FIG. 2.

Referring to FIG. 13, in the case where no clutch is disposed between the shift elements of the front planetary gear unit 5 and the middle planetary gear unit 6, constituting a portion of the rear planetary gear set 9, and only one of the brake B-1 or the clutch C-3 is disposed in the front planetary gear unit 5, the input rotation RV1 to the input shaft 2 in the reverse, third and fifth speeds has to be output from the front planetary gear unit 5 to the rear planetary gear set 9 so as to allow output of five (six) forward speeds and a reverse speed, as shown in FIG. 6, from the output shaft 3. The reverse rotation RV2 is input to the front planetary gear unit 5 at the first speed. In order to arrange the brake B-1 or the clutch C-3 so as to satisfy such requirements, the input shaft 2 can be directly connected to the sun gear S1 when only the brake B-1 exists, and the carrier CR1 can be fixed to the case 10 when only the clutch C-3 exists.

In the case of an automatic transmission having such a structure, as is obvious from the velocity diagram of FIG. 13, at the first or fourth speed during which rotation of the input shaft during a shifting operation is input directly to the rear planetary gear set 9 without passing through the elements of the front planetary gear unit 5, rotation of the ring gear R2 of the middle planetary gear unit 6 is input to the ring gear R1 of the front planetary gear unit 5 to allow the front planetary gear unit 5 to idle.

If the sun gear S1 were directly connected to the input shaft 2 without clutch C-3 and only the brake B-1 was provided, the relative speed between the sun gear S1, that reversely rotates at high speeds and rotates forward at the input rotational speed, and the CR1 and the pinions P1, P2 supported thereby may become excessively high and exceed that which is practical for the transmission.

Further, at the fourth speed, if there was no brake B-1, with the carrier CR1 fixed to the case 10 and only the clutch C-3 provided, the clutch C-3 would be disengaged by rotation of the ring gear R1. The sun gear S1 would be brought into a freely rotating state, idling at a high speed, and relative speed between the sun gear S1 and the stationary carrier CR1 would become extremely high, and likewise the relative speed would exceed that which is practical for the transmission.

To prevent the foregoing situations, in this invention, the clutch C-3 is disposed between two shift elements of the front planetary gear unit 5, i.e., between the sun gear S1 and the input shaft 2, and the brake B-1 is connected to the carrier CR1 so that the relative rotation between the shift elements of the front planetary gear unit 5 does not become excessively great as shown in the velocity diagram of FIG. 6.

Figure 7:
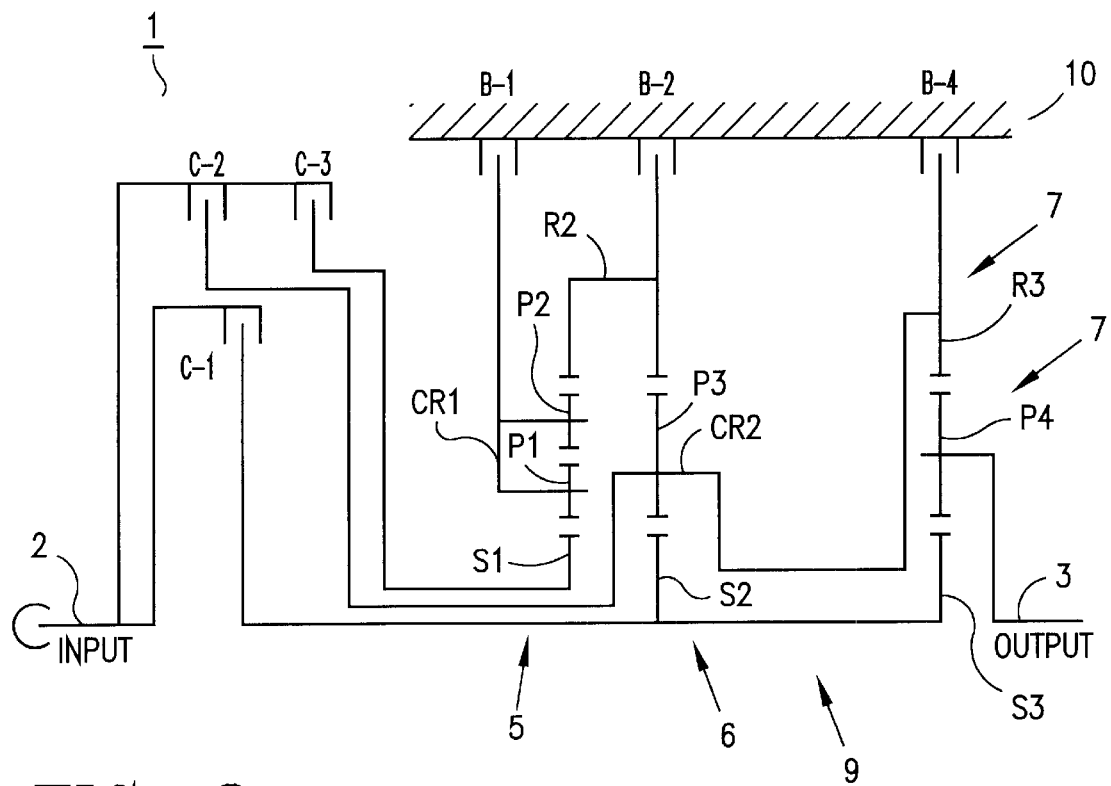
FIG. 7 is a skeletal diagram showing one arrangement of clutches of a front planetary gear unit and a brake.

FIG. 7 shows an example of a skeletal diagram of this invention emphasizing the arrangement of the brake B-1 and the clutch C-3. The basic operation is the same as that of the automatic transmission 1 shown in FIG. 1 except that the one-way clutches F-1, F-2 and F3 function as brakes B-1, B-2 and B-4, respectively.

Figure 8:
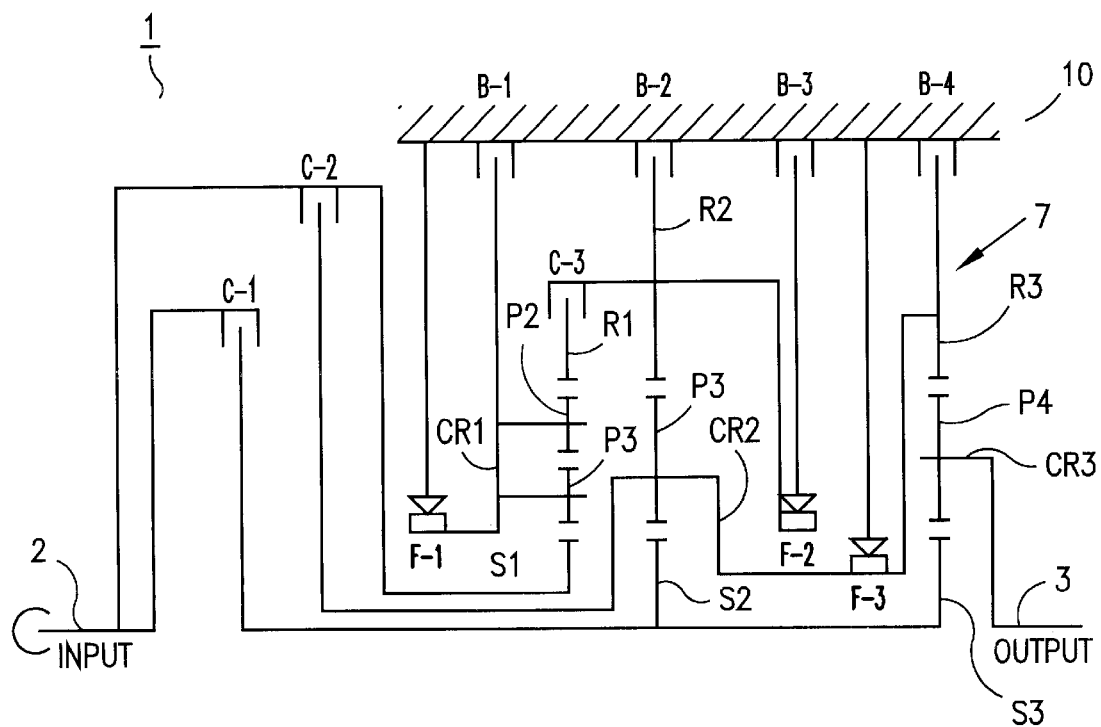
FIG. 8 is a skeletal diagram showing another arrangement of the clutches of the front planetary gear unit and the brake.

The torque load on the clutch C-3 positioned as shown in the drawing is higher as compared with the case shown in FIG. 1. As shown in FIG. 8, however, the clutch C-3 may be disposed between the ring gear R1 of the front planetary gear unit 5 and the ring gear R2 of the middle planetary gear unit 6. In this case also, it is possible to maintain the relative rotation between the shift elements of the front planetary gear unit 5 within an appropriate range. Since only the clutch C-3 is disposed between the front planetary gear unit 5 and the planetary gear set 9, it is unnecessary to dispose the one-way clutch for coasting and a clutch for operating the oneway clutch in parallel and, therefore, the automatic transmission can be accommodated in a more compact space.

The structure of the front planetary gear unit 5 is not limited so long as rotation of the input shaft 2 can be reduced and transmitted to the planetary gear set 9. In addition to the structures shown in FIGS. 1(b) and 2(b), it is possible to employ a structure in which the sun gear S1 is connected to the case through the brake B-1 and the one-way clutch F-1, or a structure in which rotation of the input shaft 2 is input to the sun gear S1 through the clutch C-3, the ring gear R1 is connected to the case through the brake B-1 and the one-way clutch F-1, and the carrier CR1 of the single pinion P1 is connected to the shift element of the rear planetary gear set 9 as shown in FIG. 9(b).

Further, as shown in FIG. 9(c), it is also possible to employ a design in which rotation of the input shaft 2 is input to the ring gear R1 through the clutch C-3, the sun gear S1 is connected to the case through the brake B-1 and the one-way clutch F-1, and the carrier CR1 with the single pinion P1 is connected to the shift element of the rear planetary gear set 9.

The teachings of Japanese Application No. 2000-002760 filed Jan. 11, 2000 and Japanese Application No. 2000-319906 filed Oct. 19, 2000, are hereby incorporated herein in their entirety, inclusive of the specifications, claims and drawings.

The invention may be embodied in other specific forms without departing from the spirit or essential characteristics thereof The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission for a vehicle comprising:
an input shaft and an output shaft;
a planetary gear unit; and
a planetary gear set having at least four shift elements, said planetary gear unit and said planetary gear set cooperating to provide multistage shifting;
wherein the planetary gear unit comprises first through third shift elements of the automatic transmission and wherein:
rotation of the input shaft is input through a first clutch directly engaging only the first shift element;
the second shift element only is engaged and stopped from rotating by a first engagement unit; and
the third shift element outputs, to the planetary gear set, rotation at a speed that is reduced relative to the rotational speed of the input shaft.

2. The automatic transmission for a vehicle according to claim 1, wherein:
the first engagement unit comprises a first brake and a first one-way clutch;
the second shift element is connected to a case and stopped from rotating when the first brake or the first one-way clutch is engaged;
the first shift element is connected to a case through a second one-way clutch and a second brake; and
the second one-way clutch is locked by engaging the second brake so as to stop the rotation of the fourth shift element of the transmission which receives the reduced speed rotation output from said planetary gear unit.

3. The automatic transmission for a vehicle according to claim 2, wherein:
the first shift element is also connected to the case through a third brake, and the fourth shift element is stopped from rotating by engagement of the first brake and the third brake.

4. The automatic transmission for a vehicle according to claim 1, wherein:
the planetary gear set includes fourth through seventh shift elements of the transmission,
the fourth shift element is integral with the third shift element of the planetary gear unit, and is stopped from rotating by a second engagement unit,
the fifth shift element is selectively connected to the input shaft by a second clutch, and is stopped from rotating by a third engagement unit,
the sixth shift element is connected to the output shaft, and
the seventh shift element is selectively connected to the input shaft by a third clutch.

5. An automatic transmission for a vehicle comprising:
an input shaft and an output shaft;
a planetary gear unit;
a first engagement unit for stopping one shift element of said planetary gear unit;
a planetary gear set having at least four shift elements; and
a first clutch for transmitting rotation of the input shaft to one of the shift elements of the planetary gear set through the planetary gear unit, in which rotation of the input shaft is transmitted to the output shaft through a selected shift element of said planetary gear set so as to achieve a selected speed stage;
wherein the planetary gear unit comprises:
a first shift element to which rotation of the input shaft is input;
a second shift element stopped from rotating by said first engagement unit; and
a third shift element for outputting rotation, at a rotational speed different from that of the input shaft, to the planetary gear set,
and wherein:
the first engagement unit comprises a first brake and a first one-way clutch, and the second shift element is stopped from rotating when the first brake or the first one-way clutch is engaged;
the first clutch is disposed between the first shift element and the input shaft;
the first shift element is connected to a case through the second one-way clutch and a second brake; and
the second one-way clutch is locked by engaging the second brake so as to stop rotation of the fourth shift element.

6. The automatic transmission for a vehicle according to claim 5, wherein:
the first clutch is disposed between the first shift element and the input shaft,
the first shift element is connected to a case through a third brake, and
the fourth shift element is stopped from rotating by engaging the first brake and the third brake.

7. The automatic transmission for a vehicle according to claim 5, wherein the first planetary gear unit outputs rotation from the third shift element, at a speed reduced relative to rotational speed of the input shaft, when the second shift element is stopped from rotating by the first engagement unit.

8. The automatic transmission for a vehicle according to claim 7, wherein:
the planetary gear set includes four shift elements,
the fourth shift element is connected to the third shift element of the first planetary gear unit, and the rotation of the fourth shift element, at least in one direction, is stopped by engagement of the second engagement unit,
a fifth shift element is selectively connected to the input shaft by a second clutch, and the rotation of the fifth shift element, at least in one direction, is stopped by engagement of the third engagement unit,
a sixth shift element is connected to the output shaft, and
a seventh shift element is selectively connected to the input shaft by a third clutch.

9. An automatic transmission for a vehicle comprising:
an input shaft and an output shaft;
a planetary gear unit; and
a planetary gear set having at least four shift elements, said planetary gear unit and said planetary gear set cooperating to provide multistage shifting;
wherein the first planetary gear unit comprises:
a first shift element which is selectively connected to the input shaft by a first clutch,
a second shift element which is stopped from rotating by a first one-way clutch or a first brake; and
a third shift element for outputting, to the planetary gear set, rotation at a speed that is reduced relative to rotational speed of said input shaft.

10. The automatic transmission for a vehicle according to claim 9, wherein:
the first clutch is disposed between the first shift element and the input shaft,
the first shift element is connected to a case through a second one-way clutch and a second brake, and
the second one-way clutch is locked by engaging the second brake so as to stop the rotation of a fourth shift element of the transmission which receives the reduced speed rotation from said third shift element.

11. The automatic transmission for a vehicle according to claim 10, wherein:
the first shift element is connected to a case through a third brake, and
the fourth shift element is stopped from rotating by engaging the first brake and the third brake.

12. The automatic transmission for a vehicle according to claim 9, wherein the first planetary gear unit outputs rotation from the third shift element, at a speed reduced relative to rotational speed of said input shaft, when the second shift element is stopped from rotating by the first one-way clutch or first brake.

13. The automatic transmission for a vehicle according to claim 9, wherein:
the planetary gear set includes fourth through seventh shift elements of the transmission,
the fourth shift element is integrally connected to the third shift element and is stopped from rotating by engagement of a second engagement unit,
the fifth shift element is selectively connected to the input shaft by a second clutch, and is stopped from rotating by engagement of a third engagement unit,
the sixth shift element is connected to the output shaft, and
the seventh shift element is selectively connected to the input shaft by a third clutch.

14. An automatic transmission for a vehicle comprising:
an input shaft and an output shaft;
a planetary gear unit comprising at least first through third shaft elements of the automatic transmission; and
a planetary gear set having at least fourth through seventh shift elements of the automatic transmission, said planetary gear unit and said planetary gear set cooperating to provide multistage shifting; and
wherein the first shift element is selectively connected to the input shaft by a first clutch;
the second shift element is stopped from rotating by a first engagement unit; and
the third shift element outputs, to the planetary gear set, rotation at a speed that is reduced relative to the rotational speed of the input shaft;
the fifth shift element is selectively connected to the input shaft by a second clutch, without passing through any of the first through third shift elements; and
the seventh shift element is selectively connected to the input shaft by a third clutch without passing through any of the first through third shift elements.

15. The automatic transmission for a vehicle according to claim 14, wherein:
the first engagement unit comprises a first brake and a first one-way clutch;
the second shift element is connected to a case and stopped from rotating when the first brake or the first one-way clutch is engaged.

16. The automatic transmission for a vehicle according to claim 15, wherein:
the first shift element is connected to a case through a second one-way clutch and a second brake; and
the second one-way clutch is locked by engaging the second brake so as to stop the rotation of a fourth shift element of the transmission which receives the reduced speed rotation output from said planetary gear unit.

17. The automatic transmission for a vehicle according to claim 15, wherein:
the first shift element is also connected to the case through a third brake, and
the fourth shift element is stopped from rotating by engagement of the first brake and the third brake.

18. The automatic transmission for a vehicle according to claim 14, wherein:
the planetary gear set includes fourth through seventh shift elements of the transmission;
the fourth shift element is integral with the third shift element, and is stopped from rotating by a second engagement unit,
the fifth shift element is selectively connected to the input shaft by a second clutch, and is stopped from rotating by a third engagement unit,
the sixth shift element is connected to the output shaft, and
the seventh shift element is selectively connected to the input shaft by a third clutch.

* * * * *

UNITED STATES PATENT AND TRADEMARK OFFICE
CERTIFICATE OF CORRECTION

PATENT NO. : 6,517,463 B2
DATED : February 11, 2003
INVENTOR(S) : Sugiura et al.

It is certified that error appears in the above-identified patent and that said Letters Patent is hereby corrected as shown below:

<u>Column 6,</u>
Line 22, "steps." should read -- steps --.

<u>Column 9,</u>
Line 49, "$\lambda_2(1+\lambda_3)/\{\lambda_2(1\lambda_3)+1-\lambda_1)\lambda_3)\}$" should read -- $\lambda_2(1+\lambda_3)/\{\lambda_2(1+\lambda_3)+1-\lambda_1)\lambda_3)\}$ --.

<u>Column 13,</u>
Line 33, after "thereof" insert a period -- . --.

Signed and Sealed this

Seventeenth Day of June, 2003

JAMES E. ROGAN
*Director of the United States Patent and Trademark Office*